Figure 1:
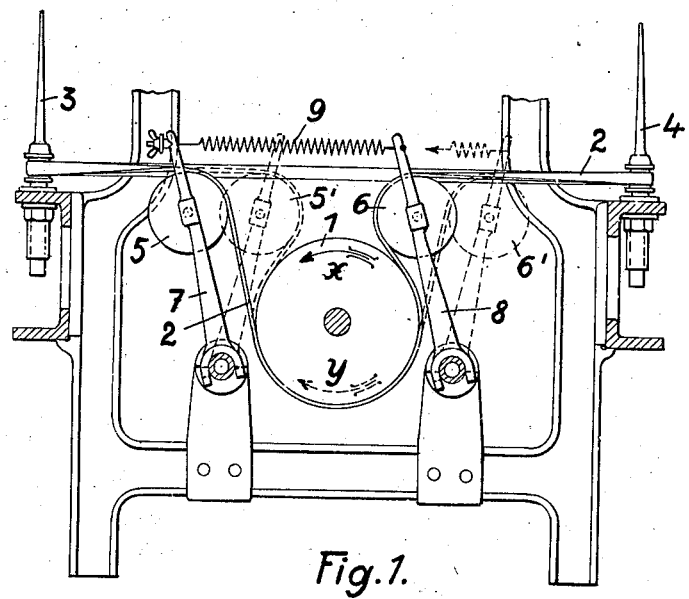

Feb. 18, 1930.  H. HAMEL  1,747,668
SPINDLE DRIVE FOR SPINNING MACHINES AND TWISTING FRAMES

Filed Dec. 18, 1928

Inventor:
Hermann Hamel

Patented Feb. 18, 1930

1,747,668

UNITED STATES PATENT OFFICE

HERMANN HAMEL, OF DRESDEN-BLASEWITZ, GERMANY

SPINDLE DRIVE FOR SPINNING MACHINES AND TWISTING FRAMES

Application filed December 18, 1928, Serial No. 326,753, and in Germany April 17, 1928.

The present invention relates to an automatic tension device for the tape or band drive in spinning machines and twisting frames and has for its object to keep the pulley tensioning the driving side always on the slack side of the tape or band running off from the main driving pulley, the essential feature of the invention residing especially in the fact that a change in the direction of driving such as from left-hand to right-hand twist automatically brings about a change in the action of the tension pulley also.

If the operation of the machine requires a change in the direction of driving and in the direction of rotation of the spindles, the running off side of the driving tape is naturally to be found on the opposite side of the main driving pulley, and as this running off side is slack, the tightening pulley must act here and tighten the belt pull so as to cause a uniform adhesion effect for all spindles to be driven.

In order to bring about a change in the position of the tightening pulley in a rapid and sure manner, the known devices provided two uniform pulleys whose axes ran parallel to the axis of the main drive. Simultaneously, these two pulleys always exercised different functions in so far as one of them acted as tightener while the other, in the same rhythm, served as guide. A change in the direction of driving naturally caused a change in the functions just mentioned, and the pulley previously serving as guide acted as tightener.

To provide for the change in the function of the pulleys arranged in large numbers side by side in one operation or to change their position at once, they were arranged in swinging arms connected in a suitable manner, e. g. by rods, with a tilting locking mechanism which was thrown over by hand like a railroad switch by means of a weighted lever. This tilting locking mechanism made it possible to shift both pulleys simultaneously in lateral direction according to the change in tension required.

As stated, the change in the position of the pulleys following a change in the direction of driving had to be effected by hand, which was a cumbersome process and caused a lot of trouble if it was forgotten to change the tightening pulleys at once.

Unlike the prior art the present invention provides a perfectly automatic change in the position of the tightening and guide pulleys simultaneously with a change in the direction of driving by arranging for the direct coupling of the two swinging arms carrying the tightening and guide pulleys and by utilizing the pull of the driving tape for bringing the pulleys from one position into another. The means of coupling the two swinging arms may be an ordinary draw rod, but in order to maintain a certain degree of elasticity during the changing of the pulleys, the invention employs a helical tension spring instead of a rigid draw rod. Instead of the swinging tightening and guide pulleys it is also possible to employ two pulleys guided in a straight line in slots and the elastic coupling means can be replaced by a weighted band.

Figure 2:
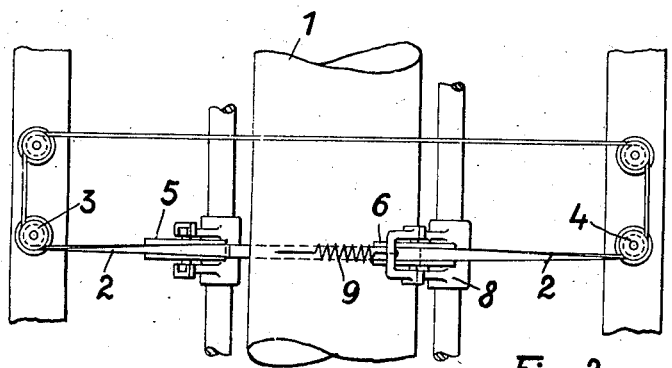

One form of the invention is illustrated in the accompanying drawing, in which Fig. 1 is a side view of the drive with the pulleys in a position indicating that the main driving pulley rotates counter-clockwise; and Fig. 2, a plan of the device.

Referring to the drawings, the driving drum or pulley 1 drives by means of the tape 2 the spindles 3, 4 arranged on both sides of the machine. The tape is guided and tightened by means of the two pulleys 5, 6 which are arranged above the main pulley 1 in the swinging arms 7, 8 placed in bearings fixed to the machine frame and provided in their lower part with small shoulders which limit the stroke of the arms. In the upper part the two swinging arms 7, 8 are connected by an elastic coupling means, that is, in this case, the tension spring 9, so that one swinging arm must follow the movement of the other when a change is brought about relative to their position.

The device functions as follows: Assumed that the direction of rotation of the main pulley 1 indicated by the arrow $x$ is to be changed to the direction indicated by the dotted arrow the direction of pull of the driving tape will change correspondingly with the result that the tape side running from the pulley 1 to pulley 6 will be tightened and the pulley 6 pressed out of its position and into the new position 6'. However, as the swinging arms 7, 8 are coupled by an elastic means, the pulley 5 cooperates in the movement of the pulley 6 and is pressed into the position 5'. The pulley can effect this change of position for the reason that to the same degree as the running on side of the tape is tightened the running off side becomes slack and can be easily pressed against the circumference of the pulley 1 and into the position 5' by the pulley 5. If the direction of driving is altered again, the process is reversed.

I claim:—

Spindle drive for spinning machines and twisting frames, provided with forward and backward movement of the driving drum to produce left-hand and right-hand twist by means of reversible pulleys having parallel axes for guiding and tightening the driving tape, comprising swinging arms serving as bearings for the said pulleys, elastic coupling and tensioning means for the said swinging arms adapted to positively cause them to oscillate in the same direction, and a driving tape engaging the said pulleys and being adapted to control the said swinging arms, the automatic tightening of the said driving tape on the running on side due to tension displacing one oscillating arm engaging the running on side, the said oscillating arm driving the other arm connected to it by the said elastic coupling means in the same direction and pulling the pulley of the said other arm in a tightening manner up to the running off side of the tape.

In testimony whereof I have affixed my signature.

HERMANN HAMEL.